(12) United States Patent
Cahill et al.

(10) Patent No.: US 6,871,244 B1
(45) Date of Patent: Mar. 22, 2005

(54) SYSTEM AND METHOD TO FACILITATE NATIVE USE OF SMALL FORM FACTOR DEVICES

(75) Inventors: Jeremy Paul Cahill, Seattle, WA (US); Andrew John Thornton, Seattle, WA (US); Jonathan Vines Smith, Seattle, WA (US)

(73) Assignee: Microsoft Corp., Redmond, WA (US)

( * ) Notice: Subject to any disclaimer, the term of this patent is extended or adjusted under 35 U.S.C. 154(b) by 95 days.

(21) Appl. No.: 10/085,792

(22) Filed: Feb. 28, 2002

(51) Int. Cl.[7] ............................................. G06F 13/10
(52) U.S. Cl. ................. 710/62; 710/7; 710/20; 710/36; 710/64; 710/105; 710/313; 710/314; 710/315
(58) Field of Search ................ 710/7, 20, 36, 710/62, 64, 105, 313, 314, 315

(56) References Cited

U.S. PATENT DOCUMENTS

| | | | |
|---|---|---|---|
| 5,894,478 A | * 4/1999 | Barzegar et al. | 370/401 |
| 5,935,224 A | 8/1999 | Svancarek et al. | 710/63 |
| 6,009,486 A | 12/1999 | Dayan et al. | 710/101 |
| 6,086,430 A | 7/2000 | Amoni et al. | 439/680 |
| 6,128,673 A | * 10/2000 | Aronson et al. | 710/22 |
| 6,334,160 B1 | 12/2001 | Emmert et al. | |
| 6,334,793 B1 | 1/2002 | Amoni et al. | 439/680 |
| 6,425,037 B1 | * 7/2002 | Kondo et al. | 710/241 |
| 6,535,522 B1 | * 3/2003 | Arato et al. | 370/466 |
| 6,628,441 B1 | * 9/2003 | Staiger | 398/164 |

OTHER PUBLICATIONS

"Removable Small Form Factor Storage Devices for Consumer Electronics and Information Appliances"; Published Jun. 1999; pp. 1–6.

O. Baltuch, et al.; "The Future Trends of PC Card Host Controllers"; This paper appears in WESCON/'95. Conf. record.; Microelectronics Communications Technology Producing Quality Products Mobile and Portable Power Emerging Technologies; Nov. 7–9, 1995; pp. 148–152.

* cited by examiner

Primary Examiner—Kim Huynh
Assistant Examiner—M. Farooq (57) ABSTRACT

A system and method to facilitate communication between an associated bus, such as employs a standard bus protocol, and a connector to which a removable SFF device can be attached. A desired operating mode is selected based on the device attached at the connector, such as either to pass the protocol between the bus and device generally unchanged or to implement suitable protocol conversion for such communication. Thus, by configuring the SFF device to appear as device currently supported by the bus, the SFF device can operate at the connector with native operating system support.

31 Claims, 9 Drawing Sheets

SYSTEM AND METHOD TO FACILITATE NATIVE USE OF SMALL FORM FACTOR DEVICES

TECHNICAL FIELD

The present invention relates generally to detection of hardware and, more particularly, to a system and method to facilitate use of small form factor devices.

BACKGROUND OF THE INVENTION

Small form factor (SFF) media are rapidly gaining popularity for use in connection with various consumer devices. For example, consumer devices, such as personal computers (PCs), handheld computers, personal digital assistants (PDAS) etc., often integrate removable (or pluggable) media products, including Compact Flash, ATA Flash, Memory Stick (e.g., from Sony), Secure Digital (SD), and Multimedia Card (MMC). Such media devices are useful tools for downloading music files from a PC to a portable audio player, or transferring pictures from a digital camera to the PC. In addition to media products, various SFF devices have been (and continually are being) developed for communications applications (wired and wireless), pointing devices, as well as other applications intended to augment functionality of a computing device.

As SFF devices and media increase in popularity, vendors and manufacturers of such products continually look for opportunities to extend the use of the integrated removable memory slot and interface logic in devices from strictly storage to general purpose I/O, and to integrate slots for these devices into mobile PCs. Extending the use of these components, for example, would create an accessory market for SFF devices and media form factors in accessories, such as modems, network adapter cards, Bluetooth transceivers, and fingerprint readers, to name a few examples.

One way to utilize SFF devices is to provide a new bus driver to directly support each respective type of the SFF device. While, at first, such an approach may seem like a reasonable way to achieve native operating system support for small form factor devices, this approach has its drawbacks.

For example, a new bus would require definition of at least one new industry standard bus specification in order for the operating system and hardware manufacturers to ensure a good end user experience. Creating such a standard is a complex and time-consuming process because of the number of interested companies and the diversity of devices seeking similar support. If a new bus exists, then a new bus driver would be required to support the new bus standard. Writing a bus driver also can be a time-consuming and expensive task because of the complexity of a bus driver. For example, the creation of a new bus driver typically includes has a long design and implementation phases and requires even longer testing phases. Another problem with creating a new device driver is that devices requiring a new bus driver will generally not be backwards compatible with earlier operating systems. As a result, new bus specifications would have to be maintained and perpetuated in future operating system releases in parallel with currently maintained specifications, in spite of the overlap between the technologies.

By way of example, if a user insects a SFF device into a corresponding slot of a computer (or other microprocessor based device) that does not leverage an existing bus in the operating system, the device will not work absent supplemental support from the device vendor. Such supplemental support, for example, includes the vendor providing an appropriate bus driver for the new bus and a device driver for the SFF device. Thus, to provide a positive experience for the end user, the vendor must ensure that the end user has access to the required bus driver and the device driver, such as through installation media (e.g., a disk) or a vendor Web site.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention generally relates to a system and method to facilitate use of various Small Form Factor (SFF) devices at a common connector, which devices can employ different bus protocols from that of a bus associated with the connector. A selector is operative to connect a removable SFF device to the associated bus through a selected one of a plurality of interfaces based on the SFF device. For example, one of the interfaces can operate as a pass-through (e.g., a direct data coupling), which enables the system to employ the bus protocol between the device and the bus without protocol conversion. The other interface (e.g., a controller) can be operative to convert between the device protocol and the bus protocol. The selectable interfaces thus enable different types of I/O devices and media to be supported at a common connector by programming and/or configuring the devices to appear as devices native to the bus.

By way of illustration, implementing SFF devices over current bus technologies allows a native bus driver to handle general tasks, such as insertion and removal events and power management without additional driver development. This reduces the need to write new drivers to handle these general tasks and third party can leverage the large installed base of computers that include the chosen I/O bus. Additionally, by representing themselves as currently supported devices to the operating systems, SFF devices can be natively supported by earlier versions of operating systems that support the chosen I/O bus. An operating system can natively support many bus driver technologies, such as, for example, USB (e.g., USB 1.1, USB 2.0) and IEEE 1394 for use in accordance with an aspect of the present invention.

Another aspect of the present invention provides a methodology to facilitate connecting a small form factor device with an internal bus that employs a predetermined protocol. The method includes detecting a type of device attached at an associated connector and selecting a communications path based on the detected type of device. The connector then is connected with the bus through the selected communications path, such that data communications with bus can occur with according to the predetermined protocol without user intervention.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents.

Other advantages and novel features of the invention will become apparent from the following detailed description of the invention when considered in conjunction with the drawings.

DESCRIPTION OF THE INVENTION

The present invention relates to communication between an associated bus, such as employs a standard bus protocol, and a connector to which a removable SFF device can be attached. The system is operative to select a desired operating mode, such as either to pass the protocol between the bus and device unchanged or to implement a suitable protocol conversion, based on the device attached at the connector. Thus, by configuring the SFF device to appear as device currently supported by the bus, the SFF device can operate at the connector with native operating system support in accordance with an aspect of the present invention.

Figure 1:
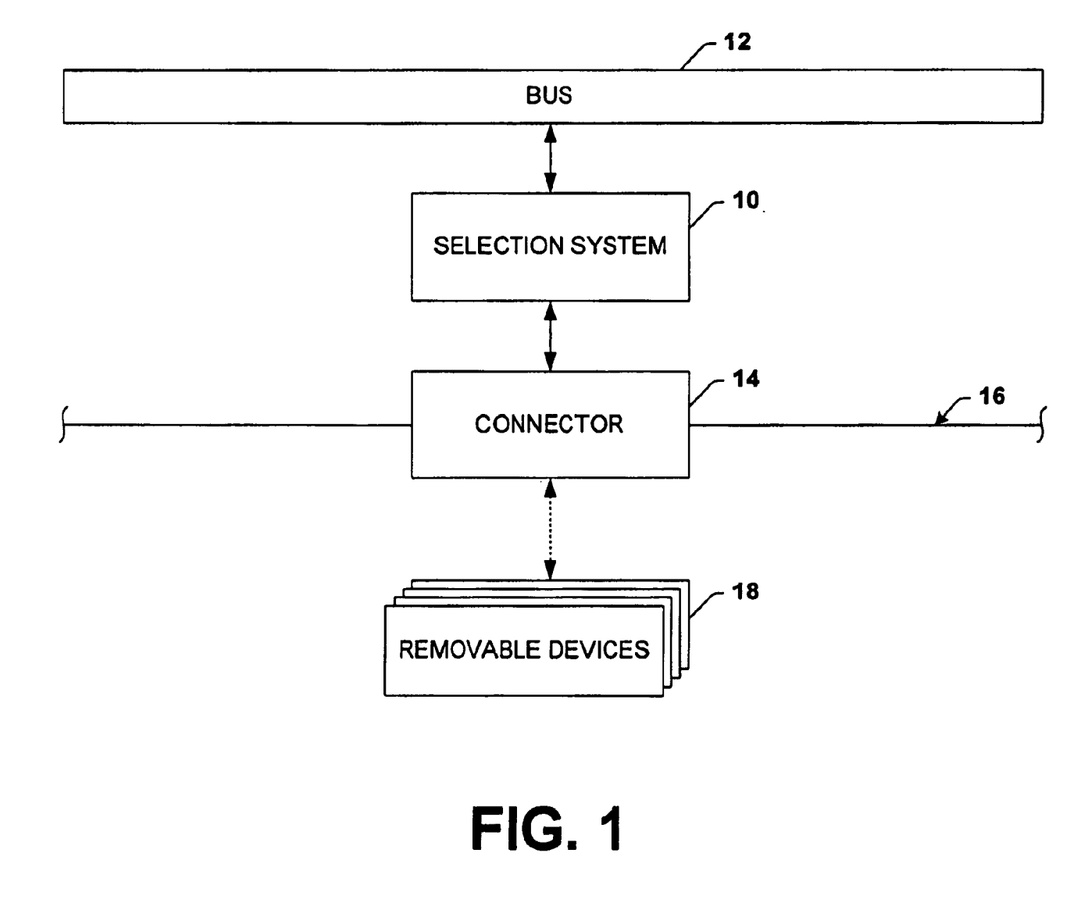
FIG. 1 is a block diagram illustrating an example of a system for connecting a device with a bus in accordance with an aspect of the present invention.

FIG. 1 depicts a selection system 10 connected between a bus 12 and a connector 14 in accordance with an aspect of the present invention. The bus 12 can be any communications system implementing a bus protocol supported in a computer or other microprocessor based machine, schematically indicated at 16. For example, the bus 12 can implement a universal serial bus (USB) protocol, such as USB version 1.1 or 2.0. It is to be understood and appreciated that other bus protocols also could employed in accordance with an aspect of the present invention, including, IEEE 1394, IEEE 1284, and so forth. While the benefits of the present invention are equally applicable to parallel and serial bus topologies, those skilled in the art will appreciate that serial buses generally require fewer physical connections and often are well suited for smaller computing devices.

The selection system 10 is programmed and/or configured to implement at least two different interface modes based on which type of removable device 18 is coupled at the connector 14. Each of the modes results in a connection between the connector 14 and the bus 12. For example, the selection system 10 can implement a native mode that passes standard bus protocols unchanged between the bus 12 and the connected device 18. To enable use of various different types of devices at the connector 14, the removable device 18 is configured to appear to as a device that is supported by the bus 12.

In order to facilitate operation of various types of devices 18, the selection system also can be programmed and/or configured to provide power to the attached device at a desired level based on the type of device 18 attached at the connector 14. That is, the device 18 does not have to be electrically compatible with the bus 12. For example, different types of SFF devices might have different power requirements, such as an input voltage of 1.5 Volts, 3.3 Volts, 5.5 Volts or other voltages. Thus, the selection system 10 is able to adapt to the power requirements of the connected device 18 and provide an appropriate voltage to the device after identifying the type of device attached at the connector 14.

The selection system 10 also can be programmed and/or configured to implement a conversion mode based on the device attached at the connector 14 in accordance with an aspect of the present invention. In the conversion mode, the selection system 10 operates to convert between the particular protocol employed by the connected device 18 and the protocol of the bus 12, according to the direction data is traveling. The protocol of the device 18 can be a protocol proprietary to the device or a protocol otherwise not directly supported by the bus 12.

Figure 2:
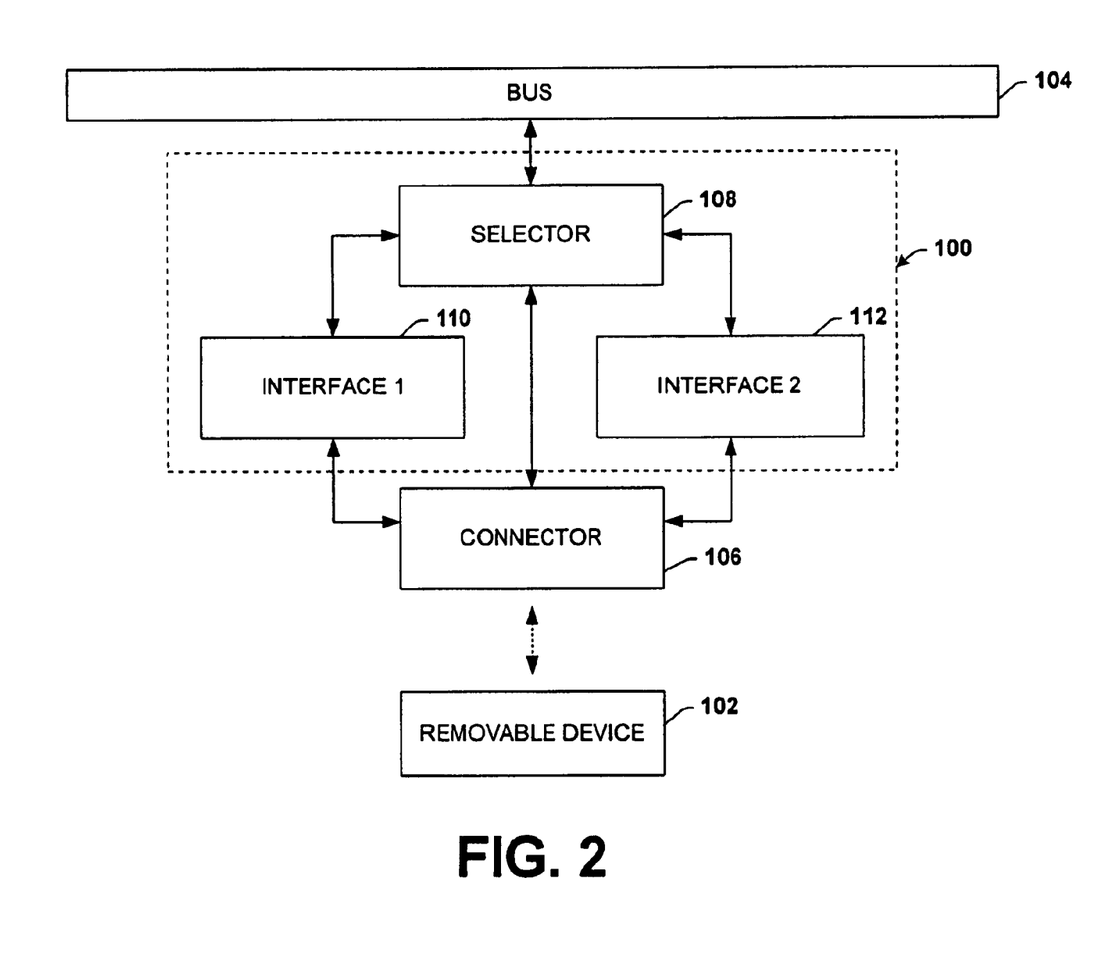
FIG. 2 is an example of an interface system in accordance with an aspect of the present invention.

FIG. 2 illustrates a selection system 100 operative to facilitate native support between a removable SFF device 102 and a bus 104 in accordance with an aspect of the present invention. In this example, the selection system 100 and the bus 104 form part of a processor-based device, such as a computer, a hand held computing device, or the like. The removable device 102 attaches to the computing system at a connector 106. The connector 106, for example, can be a slot, port or other physical connection dimension and configured to electrically couple with the removable device 102, typically including data and power connections. By way of example, the removable device 102 can be a small, form factor device, such as an I/O card or other input/output device or a small, form factor storage device.

In accordance with an aspect of the present invention, the removable device 102 is programmed or configured to expose itself as employing a standard, pre-determined protocol, namely as a device currently supported by the bus 104. However, in reality, the removable device 102 can support a different protocol from that of the bus, which can be a conventional protocol or a proprietary protocol. By way of illustration, when the removable device 102 is attached at the connector 106, the removable device appears as a known device employing a standard protocol. The connector 106 can supply to the selector 108 information (e.g., one or more bits) that identifies the type of the device 102. Based on the device identification, the selector 108 selects one of a plurality of interfaces 110 and 112 and, in turn, couples the connector 106 to the bus 104 through the selected interface. While two interfaces are illustrated in the selection system 100 of FIG. 2, it is to be understood and appreciated that the system can include more than two interfaces.

For example, when the selector 108 selects the interface 110, the connection between the connector 106 and the bus 104 is a direct data connection for coupling the removable device 102 with the bus 104. The interface 110 thus can be used in situations when the removable device 102 is identified as a device that employs a protocol supported by the bus 104.

Alternatively, if the removable device 102 employs a protocol unsupported by the bus 104, the selector 108 can select the interface 112, such that the connector is coupled to the bus through the interface 112. The interface 112 can be programmed and/or to implement appropriate protocol conversion from the protocol of the removable device to that of the bus 104. For example, the interface 112 can be a device controller that is natively supported by the bus and operative to control the device using the device protocol. Those skilled in the art will understand and appreciated that suitable conversion devices already exist, and that any such device can be employed as the interface 112 to convert from the device protocol to the bus protocol in accordance with an aspect of the present invention.

One or all of the interfaces 110 and 112 further can implement electrical conversion, in accordance with an aspect of the present invention, so that the electricals of the device 102 need not conform to the particular power requirements associated with the bus 104. For example, the interfaces 110, 112 can be configured to provide power to a power line of the connector 106 according to the requirements of the device 102, such as based on the identifying information provided to the selector 108. Alternatively or additionally, after the selector 108 connects one of the interfaces 110, 112 between the connector and bus 104, the interface itself can obtain information from the device 102 to enable the interface to supply an appropriate input voltage to power the device. The desired power can be provided from the interface itself and/or from an external source of regulated power.

Figure 3:
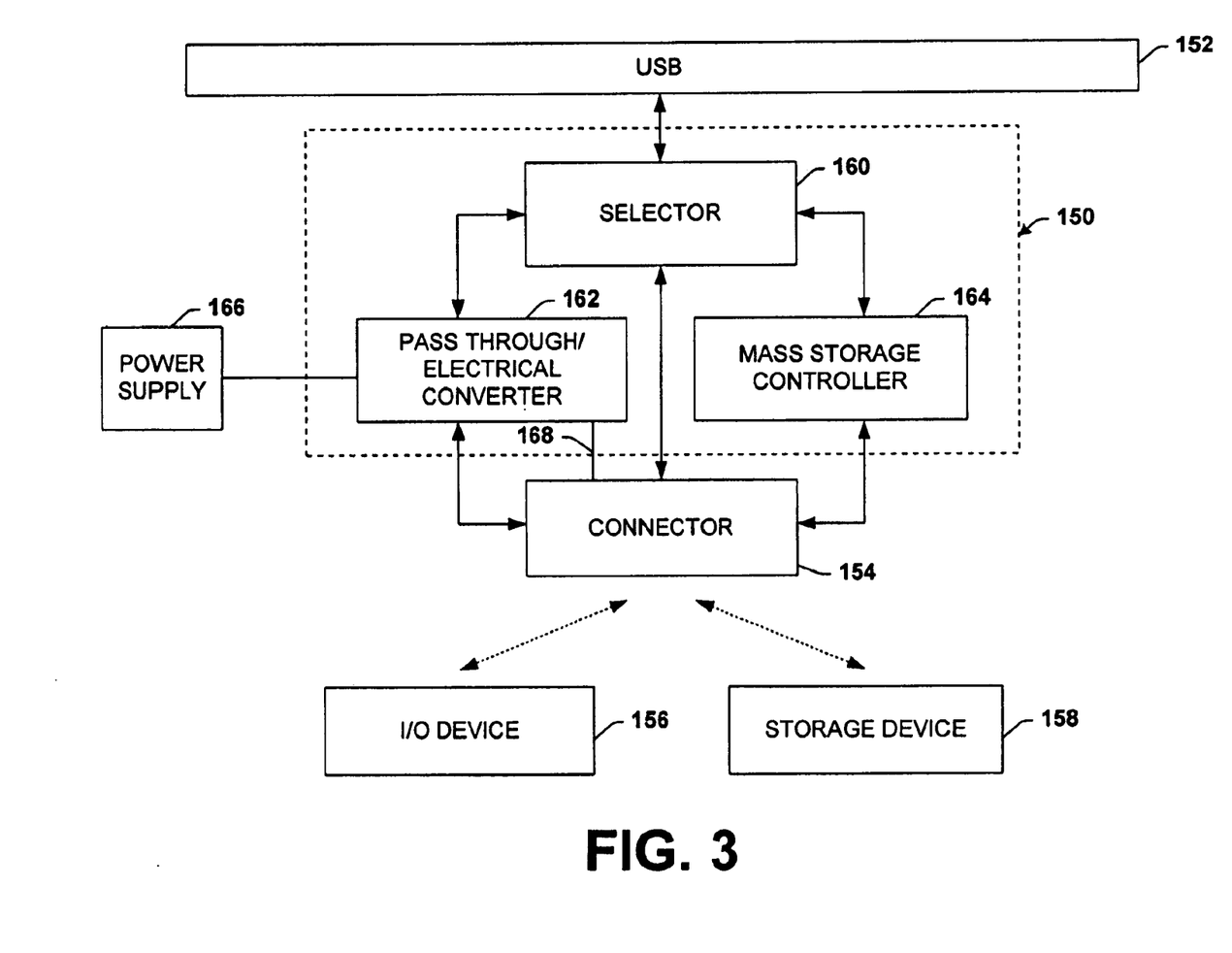
FIG. 3 is an example of an interface system implemented in accordance with an aspect of the present invention.

FIG. 3 illustrates an example of a selection system 150 that can be implemented to facilitate use of an existing serial bus 152 in accordance with an aspect of the present invention. In the example of FIG. 3, the selection system 150 is coupled between a bus 152 and a connector 154, which is adapted to connect with one (or more) of a plurality of SFF I/O devices 156 and SFF storage devices 158. The bus 152, for example, supports a serial bus protocol, such as a universal serial bus (USB) protocol (e.g., USB 1.1, USB 2.0, and so forth). Of course, it is to be understood and appreciated that the bus 152 could support other standard bus technologies. USB is particularly useful, however, due to its wide use and personal computing and the small pin numbers required for implementation.

The connector 154 can be any type of connection (male or female) operative to connect to or receive the I/O device 156 or the removable storage media (e.g., complex flash, ATA flash, Sony memory stick, secured digital, multi-media card or other media) 158. In accordance with an aspect of the present invention, the removable devices 156 and 158 are programmed and/or configured to expose themselves as USB devices or as devices natively supported by the bus protocol (e.g., as USB I/O devices or USB mass storage devices). Thus, effectively transparent communication can be implemented between the devices 156, 158 and the bus 152.

Turning now to the contents of the selection system 150, the connector 154 is coupled to a selector 160. The selector 160, which can be a multiplexer or switch system, is operative to couple the connector 154 to the bus 152 via a communications path selected according to the device 156, 158 attached at the connector. One path includes a pass through/electrical converter 162 coupled between the selector 160 and the connector 154. The other path includes a controller 164, which is natively supported by the bus 152, coupled between the selector 160 and the connector 154.

The pass through/electrical converter 162 is programmed to pass unchanged the protocols of the bus 152 and the device 156, 158 attached at the connector 154. Thus, the selector 160 operates to electrically couple the connector 154 with the bus 152 via the converter 162 when the device 156, 158 employs USB protocol (or other protocol) supported at the bus 152. Thus, when such a device is coupled with a connector, the selection system 150 exposes the device, for example, as a natively supported controller. As a result, the associated operating system can install the class driver for the natively supported controller absent user intervention, provided that the operating system has an appropriate class driver. The class driver, for example, can be loaded during an enumeration phase, which further can include assigning a unique address to the attached device for use during run-time data transfers. Alternatively, if the operating system does not have an appropriate class driver for the attached device 156, 158, a user might be prompted for a device driver. However, the vendor of the device 156, 158 need not provide the operating system manufacture with a bus driver or a device driver if supported by an existing class driver at the operating system.

The converter 162 further can implement electrical conversion for the attached device 156 so that the device 156, 158 does not have to be designed to conform to one particular electrical power standard. For example, the selection system 150, including the converter 162, can be attached to a power supply 166 such as a voltage regulator providing a desired voltage level. The converter 162 can be operative to supply voltage to the connector 154 via a power line (or connector) 168 based on the power requirements of the attached device 156. For example, some I/O devices may require 3.3 volts, while others may require 5.5 volts. Accordingly, the converter 162 can be configured to convert the regulated voltage from a power supply 166 to the desired regulated voltage level, which can be provided via 168. Alternatively, the converter 162 can be connected with external circuitry, operative to provide the desired, regulated voltage levels over 168. In this way, different I/O devices having different voltage and/or power requirements can be used for communication with the bus 152 through a selection system 150 in accordance with an aspect of the present invention.

The selector 160 also is programmed and/or configured to connect the connector 154 with the bus 152 via the controller 164, such as in a situation when the device 156, 158 does not use a protocol supported by the bus 152. When coupled with the bus 152, the controller 164 is operative to expose a SFF storage device 158 attached at the connector 154, for example, as a USB mass storage device. That is, the controller 164 operates as a USB mass storage controller that implements appropriate protocol conversion between the protocol of the attached device 158 and the USB protocol of the bus 152. Accordingly, when the SFF device is attached at the connector and coupled to the bus 152, the operating system can install a USB mass storage class driver so that the attached device works without user intervention. Because such conversion is well known in the art, details of such conversion have been omitted for sake of brevity. Thus, the SFF device 158 can leverage existing class drivers for the existing bus protocol.

It is to be appreciated that the selection system 150 can be implemented as an integrated circuit, a plurality of discrete components, or combination thereof Also, while the selection system 150 is illustrated as being separate from the connector 154, the system could be implemented within or as part of the connector in accordance with an aspect of the present invention.

Figure 4:
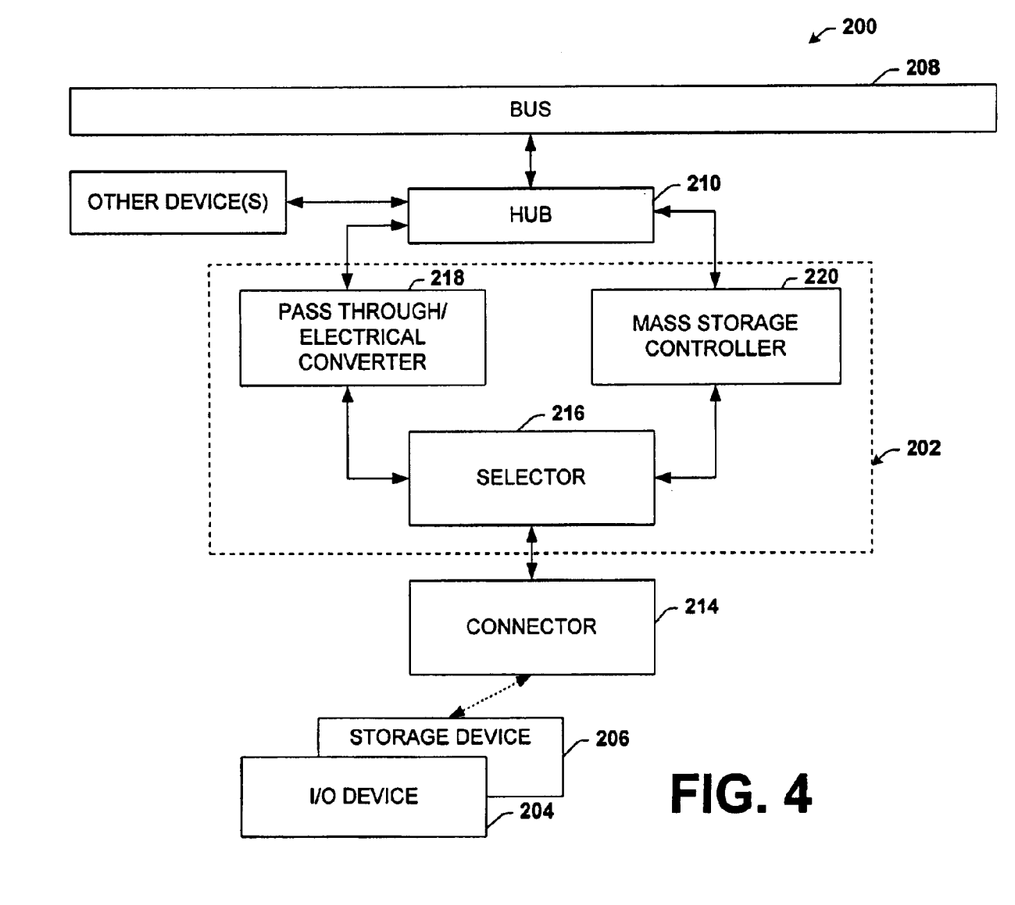
FIG. 4 is an example of an interface system implemented in accordance with another aspect of the present invention.

FIG. 4 illustrates another arrangement 200 that can employ a selection system 202 to facilitate native operating system support of various removable devices 204 and 206 over an existing according to an aspect of the invention. The removable device 204 can be any I/O device, such as a card, module or other pluggable device. For example, the I/O device 204 can be a pointing device, printer, network interface device, modem, and scanner to name a few examples. The storage device 206 can be any removable storage medium, such as FLASH memory or other non-volatile or volatile memory devices.

In the example of FIG. 4, the selection system 202 is coupled to a bus 208 via a hub 210. For an example where the bus 208 employs USB protocol, the hub can be a USB hub (e.g., a USB 1.1 or USB 2.0 hub). The hub 210 facilitates connectivity with the bus 208 for various peripherals, including the selection system 202. The hub 210 also can provide power management as well as facilitate communication of data between the bus 208 and the selection system 202. The hub 210 further can operate as a bi-directional repeater and repeat signals, as required, on upstream (towards the bus 208) and downstream (towards the device) communications. It is to be appreciated that the hub 210 can be coupled to other peripherals via one or more selection systems as well as to other devices 212 directly supported by the bus 208. The other devices 212 can be one or more other selection systems, such as described herein, or any other permanent or removable device employing a protocol supported by the bus 208. The hub 210 also can be programmed and/or configured to control the data rate for upstream and downsteam messages according to the protocol being used.

A connector 214 is coupled to a selector 216 of the selection system 202. The selection system 202, for example, can be implemented as an integrated circuit, an application specific integrated circuit or a combination of discrete or analog components implemented on a card or board. The selector 216 is programmed and/or configured to couple the connector 214 with the hub 210 through an interface 218, 220 selected according to the type of device 204, 206 attached at the connector.

In this example, the interface 220 is mass storage controller that is persistently exposed to the bus 208 via the hub 210. In contrast, the other interface 218 is implemented as a pass through/electrical converter that does not include a device or controller associated with the interface. Thus, that the interface 218 appears as an open connection to the bus 208 and only includes an exposed device/controller when the selector 216 couples the connector 212 to the hub 210 through the interface 218. Also, the interface 218 can implement desired electrical conversion so that the devices 204, 206 need not be constrained to any particular power supply requirements. For example, the electrical converter 216 can include a power controller (not shown) operative to provide variable regulated voltage, such as 1.2 volts, 3.3 volts, dependent upon the type of device attached to the connector 212 and/or its respective power requirements.

Figure 5:
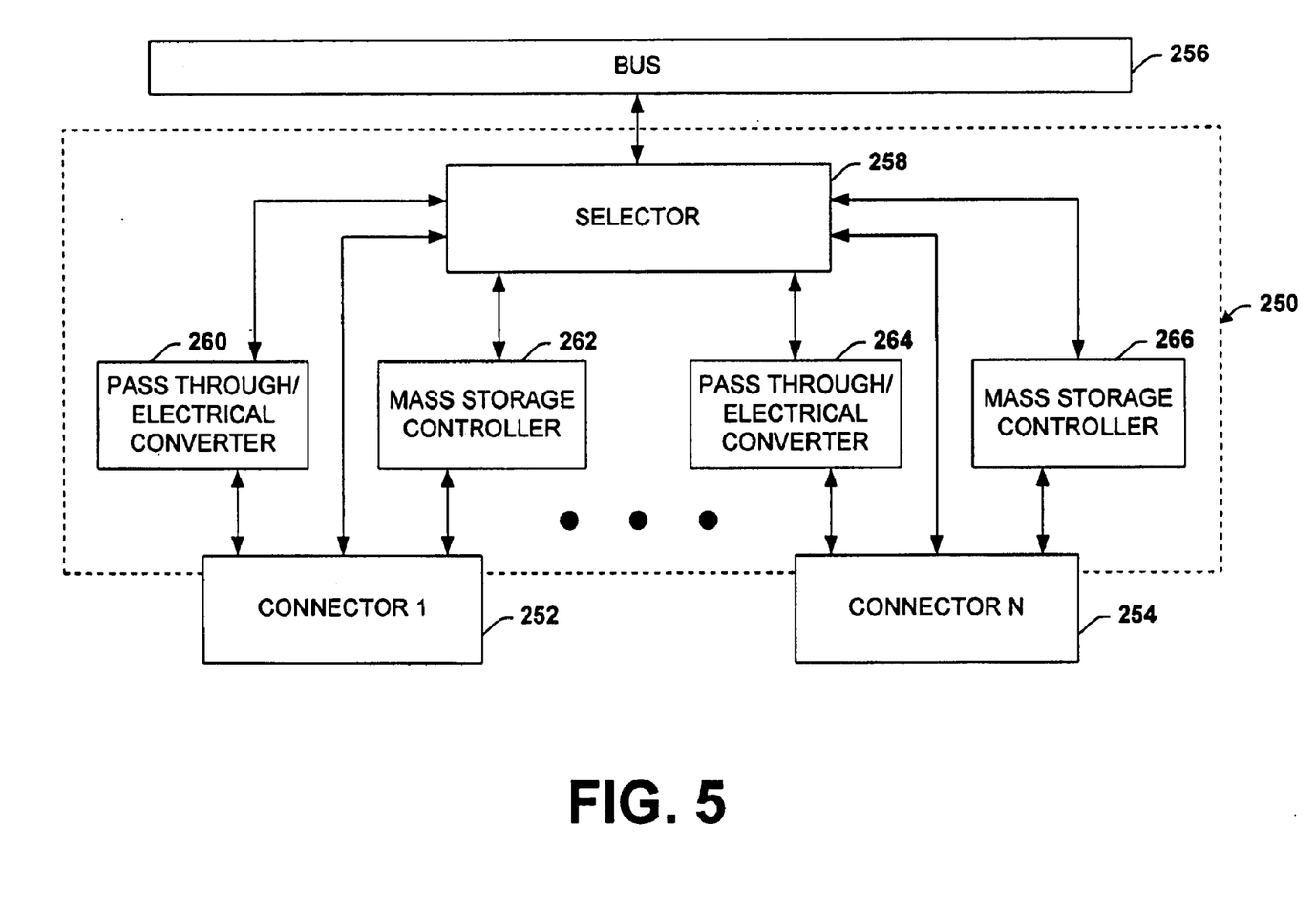
FIG. 5 is an example of a multi-connector interface system implementing a selection system in accordance with another aspect of the present invention.

FIG. 5 illustrates an example of a selection system 250 operative to support a plurality of connectors, indicated as connector 1 through connector N at 252 and 254, respectively, where N is a positive integer. The selection system 250 thus is programmed and/or configured to transparently couple the connectors 252 and 254 with a bus 256 according to a SFF device attached at the respective connectors.

The selection system 250 includes a selector 258 coupled to the connectors 252 and 254. The selector 258, which can include a multiplexer and/or a hub for the associated bus 256, is operative to couple each connector 252, 254 through one of a plurality of associated interfaces according to the type of requirements of the devices attached at the respective connectors, such as including the protocol of each device. Each connector 252, 254, for example, includes a detector (e.g., state machine) operative to initiate a protocol read from the SFF device attached thereto. This information is provided to the selector 258 that, in turn, connects the connector through an appropriate one of a plurality of interfaces 260, 262, 264, 266 based on the identification of the SFF device attached at the associated connectors. The interfaces 260 and 264 are illustrated as pass through/electrical converters and the interfaces 262 and 266 are depicted as mass storage controllers.

For example, the pass through/electrical converters 260 and 264 operate as a direct coupling for data communication between the bus 256 and the associated connectors 252 and 254 when switched into the data path by the selector 258. Thus, the pass through/electrical converter interfaces 260 and 264 allow devices employing the same protocol as the bus 256 (or a protocol supported by the bus) to pass directly between the connector 252, 254 and the bus. Additionally, the interfaces 260 and 264 can adjust the power being supplied to an attached device (e.g., voltage level or other electrical characteristics) based on the type of device. The power, for example, can be supplied to the device through one or more pins of the connectors 252, 254.

The other mass storage controllers 262 and 266 operate as device controllers for other types of SFF devices that may be attached to the connectors 252 and 254. For example, various types of mass storage devices (e.g., FLASH memory) can be attached at a connector. The mass storage devices often employ different protocols than the bus 256. Accordingly, the mass storage controllers 262 and 266 are programmed and/or configured to implement appropriate protocol conversion for data communication between the bus 256 and the device(s) attached at the respective connectors 252 and 254. For example, when a predetermined mass storage device is attached at one or more of the connectors 252 and 254, the device is exposed to the associated operating system as native mass storage device and the operating system can thus load a corresponding class driver so that the device works without user intervention. Alternatively, if no appropriate device driver is available to the operating system, the user may be prompted for the driver.

Figure 6:
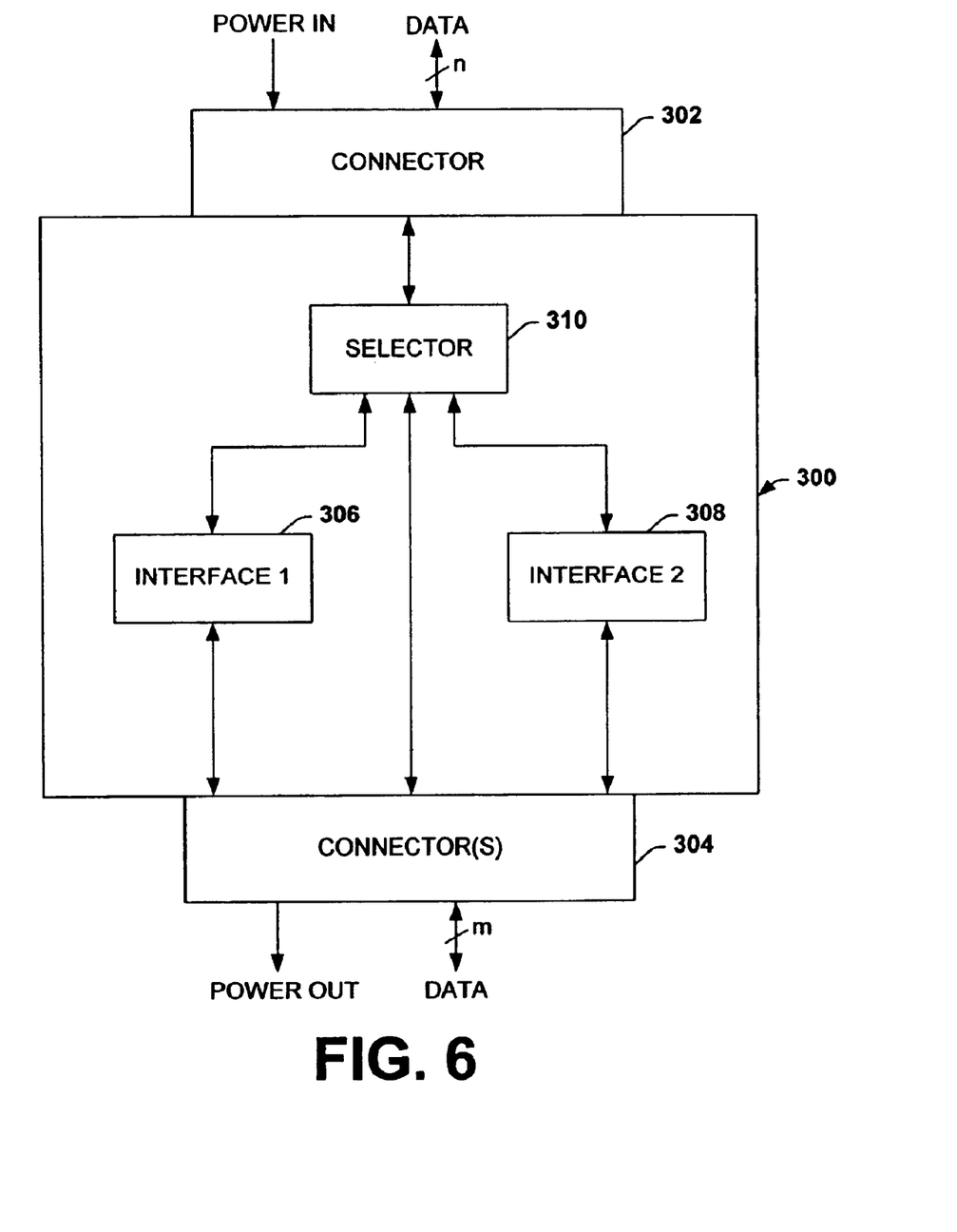
FIG. 6 is a block diagram of a connector module implementing a selection system in accordance with an aspect of the present invention.

FIG. 6 illustrates a portable connector module 300 operative to facilitate native operating system support of SFF devices, such as by providing a modular connection to facilitate attaching the device to a computing device, in accordance with an aspect of the present invention. The connector module 300 includes a first connector 302 that is operative to connect to a mating connector of a computing device, such as, for example, a USB connector IEEE 1394 connector or the like. The connector module 300 also includes one or more other connectors 304 operative to connect with a SFF device such as an I/O device or a mass storage device. The SFF device is programmed and/or configured to identify (or expose) itself as a native I/O device supported by a particular bus or as a storage device supported by the bus, such as by providing information or protocol via a pin of the connector.

The connector module 300 further includes a selection system operative to electrically couple the respective connectors 302 and 304 through one of a plurality of interfaces 306 and 308, which can include hardware and/or software. The connector module 300 also includes a selector 310 operative to couple the respective connectors 302 and 304 through one of the interfaces 306 and 308 based on the type of device or protocol of the device attached at the connector 304.

By way of example, the connector 304 includes a detector or state machine operative to provide identifying information to the selector 310 indicative of the type of device attached at the connector. The selector, in turn, couples an appropriate interface 306 or 308 through to the connector 302 such that a path is formed between the respective connectors 302 and 304 through the selected interface. Power for the selection system 300 (including the selector 310 and interfaces 306 and 308) can be provided through one or more power inputs of the connector 302 when attached at the computing device. Data is provided between the connector 302 and the associated computing device over one or more data lines.

It is to be understood and appreciated that while the selection system illustrated within the connector assembly 300 is of the type shown and described with respect to FIG. 3 that other selection system arrangements, such as that shown in FIG. 4, also could be utilized in a connector module in accordance with an aspect of the present invention. Additionally, it is to be understood and appreciated that more than one SFF device could be attached at the connector 304.

Figure 7:
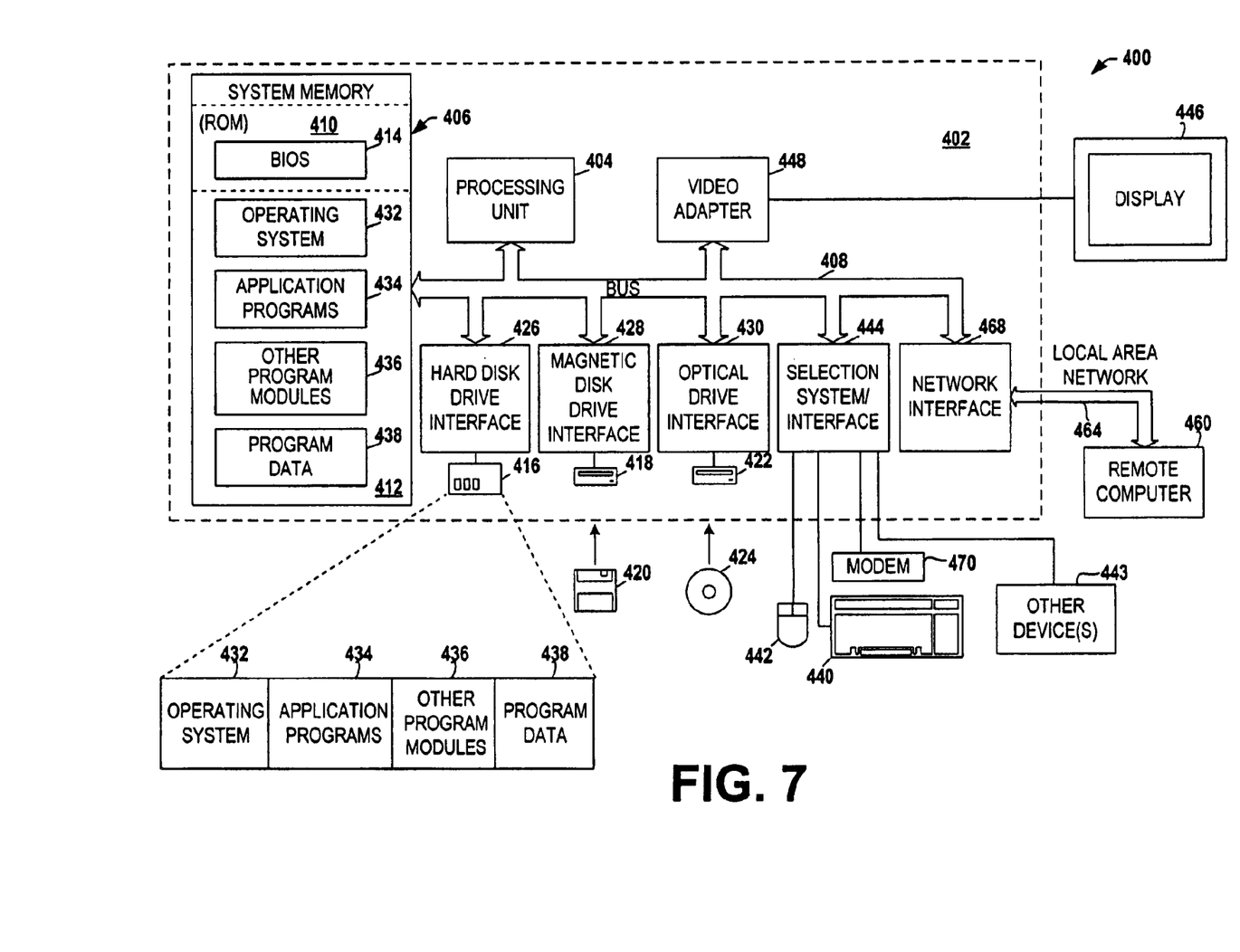
FIG. 7 is an example of an operating environment implementing an interface in accordance with an aspect of the present invention.

In order to provide additional context for various aspects of the present invention, FIG. 7 and the following discussion are intended to provide a brief, general description of one possible environment 400 in which the various aspects of the present invention may be implemented. It is to be appreciated that the computing environment 400 is but one possible computing environment and is not intended to limit the environments with which the present invention can be employed. Those skilled in the art will appreciate that the inventive methods may be practiced with other system configurations, including single-processor or multiprocessor computer systems, minicomputers, as well as personal computers, hand-held computing devices, microprocessor-based or programmable consumer electronics, video game consoles, and the like.

While various aspects of the present invention have been described above in the general context of computer-executable instructions that may run on one or more computers or other microprocessor-based equipment, it is to be recognized that the invention also may be implemented in combination with other program modules and/or as a combination of hardware and software. Generally, program modules include routines, programs, components, data structures, etc. that perform particular tasks or implement particular abstract data types.

FIG. 7 illustrates one possible hardware configuration to support the systems and methods described herein. It is to be appreciated that although a standalone architecture is illustrated, that any suitable computing environment could be employed in accordance with the present invention. For example, computing architectures including, but not limited to, stand alone, multiprocessor, distributed, client/server, minicomputer, mainframe, supercomputer, digital and analog can be employed in accordance with the present invention.

With reference to FIG. 7, the exemplary environment 400 for implementing various aspects of the invention includes a computer 402, including a processing unit 404, a system memory 406, and a system bus 408 that couples various system components including the system memory to the processing unit 404. The processing unit 404 may be any of various commercially available processors. Dual microprocessors and other multi-processor architectures also can be used as the processing unit 404. The computer 402 and/or portions thereof may be implemented as any microprocessor-based appliance having one or more connectors for attaching to SFF devices, such as, for example, a telephone (wired or wireless), a personal computer (PC) (e.g., handheld, desktop, portable, etc.), a roaming PC, a PDA, game console or entertainment appliance, or any other microprocessor-based appliance.

The system bus 408 may be any of several types of bus structure including a memory bus or memory controller, a peripheral bus, and a local bus using any of a variety of commercially available bus architectures, including USB 1.1, USB 2.0, IEEE 1284, IEEE 1394 to name a few. The system memory 406 includes read only memory (ROM) 410 and random access memory (RAM) 412. A basic input/output system (BI/OS) 414, containing the basic routines that help to transfer information between elements within the computer 402, such as during start-up, is stored in ROM 412.

The computer 402 may further include a hard disk drive 416, a magnetic disk drive 418, e.g., to read from or write to a removable disk 420, and an optical disk drive 422, e.g., for reading and/or writing data relative to 424 optical media. The hard disk drive 416, magnetic disk drive 418, and optical disk drive 422 are connected to the system bus 408 by a hard disk drive interface 426, a magnetic disk drive interface 428, and an optical drive interface 430, respectively.

The computer 402 typically includes at least some form of computer readable media, such as include RAM, ROM, EEPROM, flash memory or other memory technology, CD-ROM, digital versatile disks (DVD), or other magnetic storage devices, or any other medium which can be used to store the desired information and which can be accessed by the computer 402. It is to be appreciated that such media can be hardwired directly to the system bus through corresponding interfaces or one or more media can be coupled to the computer 402 via a connector and selection system as described herein.

A number of program modules may be stored in the drives and RAM 412, including an operating system 432, one or more application programs 434, other program modules 436, and program non-interrupt data 438. The operating system 432 in the illustrated computer can be any of a number of commercially available or proprietary operating systems, which store a library of class drivers for various types of SFF devices that can be attached to the computer in accordance with an aspect of the present invention.

A user may enter commands and information into the computer 402 through a keyboard 440 and a pointing device, such as a mouse 442. Other devices (e.g., I/O devices and/or mass storage devices) 443 also could be coupled to the system bus 408, including a microphone, an IR remote control, a joystick, a game pad, a scanner, or the like. These and other input devices are often connected to the processing unit 404 through a selection system 444 employing two or more interfaces for connecting the attached input or I/O devices to the system bus 408. The interfaces can include, for example, a parallel port, a game port, a Universal Serial Bus ("USB"), an IR interface, IEEE 1394, etc. A monitor 446, or other type of display device, is also connected to the system bus 408 via an interface, such as a video adapter 448. In addition to the monitor, a computer typically includes other peripheral output devices (not shown), such as speakers, printers etc.

The computer 402 may operate in a networked environment using logical connections to one or more remote computers, such as a remote computer(s) 460. The remote computer(s) 460 may be a workstation, a server computer, a router, a personal computer, a microprocessor based entertainment appliance, a peer device, or other common network node. The remote computer may include many or all of the elements described relative to the computer 402, although, for purposes of brevity, only a memory 462 is illustrated. The logical connections depicted include a local area network (LAN) 464 and a wide area network (WAN) 466, such as the Internet. Such networking environments are commonplace in offices, enterprise-wide computer networks, intranets, and the Internet.

When used in a LAN networking environment, the computer 402 is connected to the local network 464 through a network interface or adapter 468, which can include a selection system in accordance with an aspect of the present invention. When used in a WAN networking environment, the computer 402 typically includes a modem 470, or is connected to a communications server on the LAN, or has other means for establishing communications over the WAN 466. The modem 470, which may be internal or external relative to the computer 402, for example, is connected to the system bus 408 via the selection system 444. In a networked environment, program modules 436, application programs, or portions thereof, may be stored in the remote memory storage device 462. Similarly, when the computer 402 stores target data, such data may be stored in memory 426, 428, 430 of the computer or remote memory 462. It will be appreciated that the network connections shown are exemplary and other means of establishing a communications link between the computers can be used.

Figure 8:
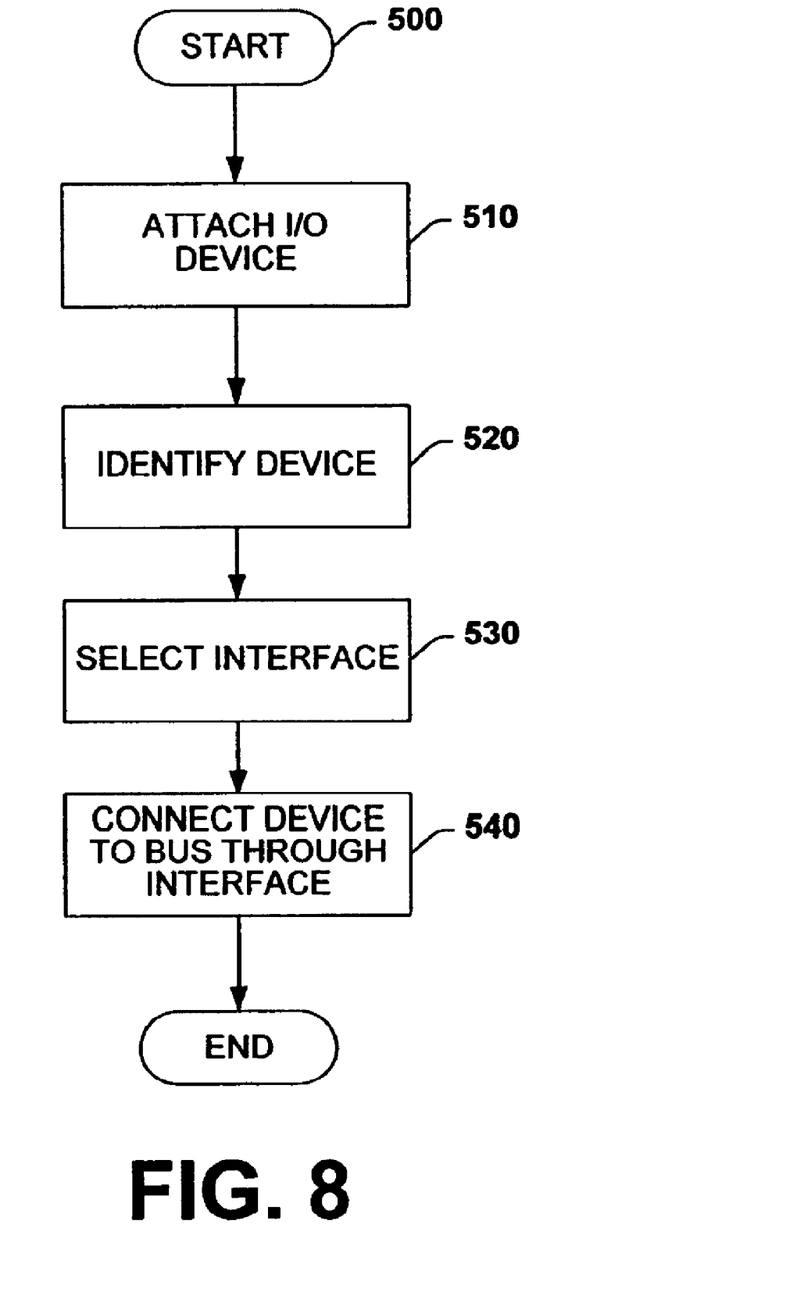
FIG. 8 is a flow diagram illustrating a simplified methodology for connecting a device with a bus in accordance with an aspect of the present invention.
Figure 9:
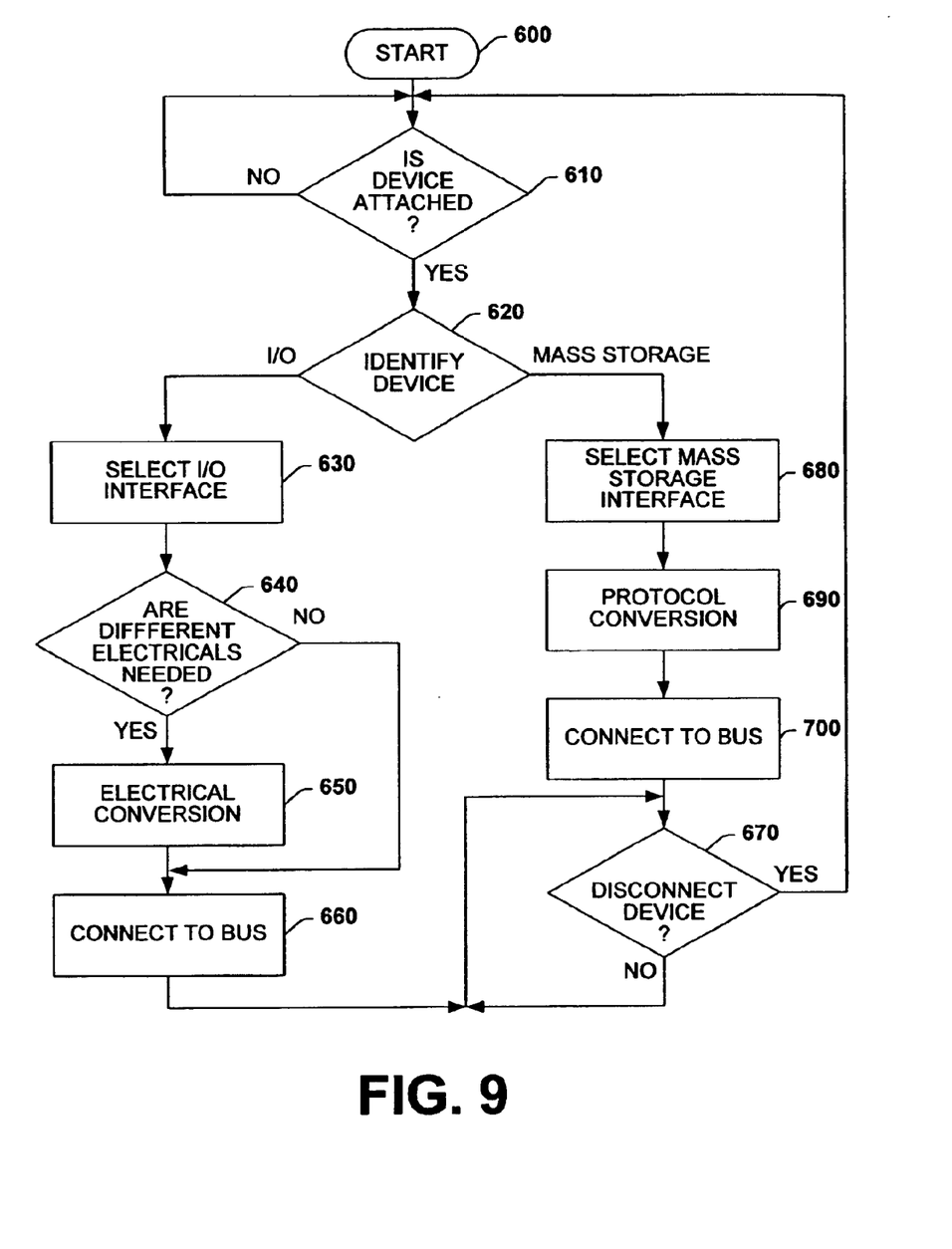
FIG. 9 is a flow diagram illustrating a methodology to selectively connect a device with a bus in accordance with an aspect of the present invention.

In view of the exemplary systems shown and described above, methodologies, which may be implemented in accordance with the present invention, will be better appreciated with reference to the flow charts of FIGS. 8 and 9. While, for purposes of simplicity of explanation, the methodologies are shown and described as implementing serially, it is to be understood and appreciated that the present invention is not limited by the illustrated order, as some aspects can and often do occur in different orders and/or concurrently with other features shown and described herein in accordance with the present invention. Moreover, not all illustrated aspects may be required to implement a methodology in accordance with the present invention. In addition, the methodologies of FIGS. 8 and 9 may be described in the general context of computer-executable instructions, such as program modules, executed by one or more hardware modules or other devices (e.g., integrated circuitry). Typically the functionality of the program modules may be combined or as desired in various embodiments.

FIG. 8 is a flow diagram illustrating a methodology for connecting a SFF device to a bus in accordance with an aspect of the present invention. The methodology begins at 500, such as in connection with powering up an associated microprocessor-based machine to which the SFF device is to be attached. At 510, a SFF device is attached at a connector. At 520, in response to attaching the SFF device, device characteristics, such as a device type or device class, is identified. Such identification, for example, can be based on one or more pins associated with the device and/or protocols supported by the device. Next, at 530, an interface is selected based on the identity of the device the SFF device, which can be discerned from the identified device characteristics. From 530, the methodology proceeds to 540 in which the SFF device attached at 510 is coupled to a bus of the machine through the selected interface and the methodology ends. Once coupled, the SFF device can be enumerated and an appropriate device driver loaded by the operating system to enable use of the device by the associated machine.

FIG. 9 illustrates another methodology for connecting a SFF device with a bus in accordance with an aspect of the present invention. The methodology begins at 600, such as in connection with powering up a selection system operatively associated with a bus. For example, the selection system can be implemented as an integrated part of a microprocessor based computing device (e.g., a computer or microprocessor based appliance) supporting a standard bus protocol or as a removable connector module that can be attached to a connector associated with a bus. Thus, the selection system derives power from the associated computing device.

Next, at 610, a determination is made as to whether a SFF device has been attached. If a determination is negative, the methodology loops at 610 until a device is attached. After a device has been detected as being attached, the device is identified at 620. The identification, for example, can be made based on data colleted from the connector, such as from a pre-determined output pin(s) or from protocol associated with the SFF device.

If at 620, the devices identified an I/O device, the methodology proceeds to 630. At 630, an appropriate I/O interface is selected. For example, the I/O interface may operate as a direct pass through of the protocol between the device and the associated bus of the computing device. Next, at 640, a determination is made as to whether different electricals are needed. For example; the methodology is adaptable to provide desired power requirements to the attached I/O device. If different electricals are needed, the methodology proceeds to 650 in which electrical conversion is implemented. The electrical conversion can be employed as a step-up or step-down voltage converter based on the type of device identified at 620. If the determination at 640 is negative from 650 after employing desired electrical conversion, the methodology proceeds to 660 in which the SFF device is coupled to the bus through the I/O interface. The connection to the bus also typically results in the associated operating system loading an appropriate device driver, such as during an enumeration of the SFF device. From 660, the methodology proceeds to 670.

At 670, a determination is made as to whether the attached device has been disconnected. If the device remains connected, the methodology remains at 670 with the electrical conversion and pass through of protocols being maintained during the connection. In the event that the device is disconnected, the methodology returns to 610. A selection of a default interface may be made in response to the affirmative determination at 670 or, alternatively, the when a device is disconnected a previously used interface can be employed or the interface connection between the bus and connector can be broken.

If, at 620, the device is identified as a mass storage device, the methodology proceeds from 620 to 680. At 680, a mass storage interface is selected. For example, the mass storage interface can be amass storage controller, such as a USB (e.g., USB 1.1, USB 2.0 and so forth) or IEEE 1394 mass storage controller. Next, at 690, an appropriate protocol converter is employed. The protocol converter is operative to convert between the protocol of the attached mass storage device and that of the native bus. With the protocol converter activated, the mass storage device is connected to the bus at 600, which results in the operating system loading an appropriate device driver. From 600, the methodology proceeds to 670.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An apparatus to facilitate operation of a small form factor device that is removably attached at a connector, comprising:
    a selection system operatively coupled to route data between a bus and the connector;
    the selection system operating in a first mode to convert between a protocol supplied at the connector and a protocol of the bus if the device attached at the connector employs a different protocol from the protocol of the bus;
    the selection system operating in a second mode to pass the protocol between the bus and the connector without protocol conversion if the device attached at the connector employs a protocol supported by the bus;
    the selection system further comprising a first interface that implements the first mode, a second interface that implements the second mode, and a selector that connect the connector with the bus through a selected one of the first and second interfaces based on the type information; and
    the connector comprising a detector operative to detect the device attached at the connector and provide type information to the selection system identifying a type of the device, the selection system selecting one of the operating modes based on the type information.

2. The apparatus of claim 1, the first interface component comprises a controller that, when connected to the bus, is exposed to the bus as a device controller supported by the bus.

3. The apparatus of claim 2, the device controller further comprises a mass storage controller operative to communicate data with a small form factor storage device attached at the connector.

4. The apparatus of claim 1, the second interface further comprises an electrical converter operative to accommodate power requirements of the device attached at the connector based on the type information.

5. The apparatus of claim 1, the selector comprising a multiplexer.

6. The apparatus of claim 1, the device attached at the connector being configured to employ one of the protocol of the bus and a predetermined other protocol supported by the first interface.

7. The apparatus of claim 1, the selector is coupled between the first and second interfaces and the bus.

8. The apparatus of claim 1, the selector is coupled between the connector and the first and second interfaces.

9. The apparatus of claim 8, further comprising a hub coupled between the first and second interfaces and the bus.

10. The apparatus of claim 1, the protocol of the bus comprising a serial bus protocol.

11. The apparatus of claim 10, the serial bus protocol conforming to one of universal serial bus, IEEE 1394.

12. The apparatus of claim 1, the selection system implemented as an integrated circuit.

13. The apparatus of claim 1, the connector is a first connector, and the selection system is coupled between the first connector and a second connector, the second connector bang configured to removably connect to a mating connector part that is electrically associated with the bus.

14. The apparatus of claim 1, the connector is a first connector, the selector and the interfaces being coupled between the first connector and a second connector, the second connector being configured to removably connect to a mating connector part that is associated with the bus, whereby the system forms part of a modular connector.

15. A system to facilitate use of an existing bus by one of a plurality of removable devices implementing at least two different bus protocols, each one of the plurality of devices being adapted to expose itself to the bus as a type of device native to the existing bus, the system comprising:
    a connector configured to electrically and operatively couple with each of the plurality of removable devices;
    a selector operative to selectively connect the connector with the bus through a selected one of at least two interfaces based on a protocol employed by the removable device attached at the connector; and
    the first of the at least two interfaces comprising a controller that, when connected to the bus by the selector, is exposed to the bus as a device controller native to the bus operative to convert between a protocol employed by the bus and a predetermined protocol of the removable device attached at the connector.

16. The system of claim 15, the selector is operative to employ the selected interface based on information that indicates the removable device attached at the connector is a predetermined type of device.

17. The system of claim 15, the device controller further comprises a mass storage controller operative to communicate data with a small form factor storage device attached at the connector.

18. The system of claim 15, a second of the at least two interface being operative to pass data between the connector and bus without protocol conversion.

19. The system of claim 18, the second interface further comprises an electrical converter operative to accommodate power requirements of the one removable device attached at the connector.

20. The system of claim 15, the bus employs a protocol conforming to a standard serial bus protocol.

21. The system of claim 15, the selector is coupled between the interfaces and the bus.

22. The system of claim 15, the selector is coupled between the connector and the interfaces.

23. The system of claim 22, further comprising a hub coupled between the interfaces and the bus.

24. The stem of claim 15 implemented as an integrated circuit.

25. A method for connecting a small form factor device with an internal bus that employs a predetermined protocol, the method comprising:
    detecting a type of device attached at a connector;
    selecting one of at least two communications paths based on the detected type of device;
    connecting the connector with the bus through the selected communications path, such that data communications with bus can occur according to the predetermined protocol of the bus;

providing type information to the selection system identifying the detected type of device in response to the detecting, and selecting one of at least operating modes having different protocol characteristics based on the type information; and if the type information indicates a first type of device, the connecting further comprising connecting the connector with the bus through a first interface that passes data through the first interface without protocol conversion.

26. The method of claim 25, further comprising controlling electrical power provided to the connector for the device based on the type information.

27. The method of claim 25, further comprising:

if the type information indicates a second type of device, the connecting further comprising connecting the connector with the bus through a second interface that implements protocol conversion for data communicated between the bus and the device.

28. The method of claim 27, the second interface further comprises a mass storage controller operative to communicate data with a small form factor storage device attached at the connector.

29. The method of claim 27, further comprising using a serial bus protocol for data communicated between each of the first and second interfaces and the bus.

30. The method of claim 29, the serial bus protocol coming to one of universal serial bus protocol and IEEE 1394.

31. The method of claim 27, further comprising routing data communicated to and from a selected one of the first and second interfaces and the bus through a hub.

* * * * *